United States Patent [19]

Kirker et al.

[11] Patent Number: 4,968,402
[45] Date of Patent: Nov. 6, 1990

[54] PROCESS FOR UPGRADING HYDROCARBONS

[75] Inventors: Garry W. Kirker, Washington Township, Gloucester County; Stuart S. Shih, Cherry Hill, both of N.J.

[73] Assignee: Mobil Oil Corp., New York, N.Y.

[21] Appl. No.: 479,799

[22] Filed: Feb. 14, 1990

[51] Int. Cl.5 .................. C10G 69/04; C10G 69/10
[52] U.S. Cl. ................................. 208/68; 208/111
[58] Field of Search .......................... 208/111, 68

[56] References Cited

U.S. PATENT DOCUMENTS

| | | | |
|---|---|---|---|
| 3,130,007 | 4/1964 | Breck | 423/329 |
| 4,305,808 | 12/1981 | Bowes et al. | 208/111 |
| 4,426,276 | 1/1984 | Dean et al. | 208/68 |
| 4,439,409 | 3/1984 | Puppe et al. | 423/329 |
| 4,738,766 | 4/1988 | Fischer et al. | 208/111 |
| 4,764,266 | 8/1988 | Chen et al. | 208/111 |
| 4,789,457 | 12/1988 | Fischer et al. | 208/111 |
| 4,812,224 | 3/1989 | Miller | 208/111 |
| 4,826,667 | 5/1989 | Zones et al. | 423/277 |
| 4,828,677 | 5/1989 | Fischer et al. | 208/111 |
| 4,919,789 | 4/1990 | Fischer et al. | 208/89 |

FOREIGN PATENT DOCUMENTS

| | | | |
|---|---|---|---|
| 0231860 | 8/1987 | European Pat. Off. | 502/64 |
| 0293032 | 11/1988 | European Pat. Off. | 502/64 |

*Primary Examiner*—Anthony McFarlane
*Attorney, Agent, or Firm*—Alexander J. McKillop; Charles J. Speciale; Dennis P. Santini

[57] ABSTRACT

A one stage catalytic process for producing high octane gasoline from a highly aromatic hydrocarbon feedstock. The process comprises hydrocracking the feedstock with an NiW/MCM-22 zeolite catalyst. Fractionation of the hydrocracker effluent provides a high octane gasoline fraction.

17 Claims, 2 Drawing Sheets

PROCESS FOR UPGRADING HYDROCARBONS

BACKGROUND OF THE INVENTION

This invention relates to upgrading hydrocarbons to produce a high-quality naphtha fraction. More particularly, it pertains to hydrocracking highly aromatic light cycle oil in the presence of zeolite MCM-22 catalyst to produce a high octane gasoline.

As the demand for high quality gasolines increases, petroleum refineries are finding it necessary to convert increasingly greater proportions of crude oil to premium high octane fuels.

Catalytic hydrocracking processes have proven useful for converting heavy feedstocks such as gas oils and cycle oils to naphthas and middle range distillates such as diesel and jet fuels. Catalytic cracking without hydrogen is not able to effectively convert aromatic compounds, which are highly refractory. Hydrocracking, on the other hand, has proven effective in converting the refractory aromatic effluents from the catalytic crackers into premium gasoline. Fortuitously, the hydrogen necessary for hydrocracking is largely provided by another refinery process, i.e., reforming.

The added hydrogen saturates the aromatic carbon bonds thereby converting aromatics to cycloparaffins which can then undergo ring scission and dealkylation. Polynuclear aromatics, such as anthracene can be reduced to mononuclear aromatics (e.g. benzene, toluene, etc.), paraffins, and cycloparaffins.

U.S. Pat. No. 4,305,808 (Bowes et al.) discloses a catalytic hydrocracking process for converting polynuclear aromatic containing feedstock by contacting with a zeolite catalyst.

U.S. Pat. No. 3,130,007 discloses the preparation of zeolite Y. Zeolite Y is now standardly prepared in a modified form, ultra-stable Y (USY) which is used in various hydrocarbon conversion processes.

U.S. Pat. No. 4,738,766 (Fischer et al.) discloses a moderate pressure hydrocracking process in which a highly aromatic feedstock having a boiling range between 300° F. and 650° F. is processed to high octane gasoline by hydrocracking over a large pore catalyst such as Zeolite Y.

U.S. Pat. No. 4,764,266 (Chen et al.) describes a hydroprocessing scheme in which high boiling fractions such as gas oil and cracked cycle oils are converted into jet fuels and naphthas suitable for reforming into high octane gasoline by hydrocracking with a large pore zeolite X or zeolite Y catalyst, followed by hydroprocessing with zeolite beta.

SUMMARY OF THE INVENTION

A method is provided for producing high octane gasoline from aromatic cycle oils by a one stage hydrocracking process. LCO (light cycle oil) is hydrocracked at low pressure with a NiW/MCM-22 zeolite catalyst. The LCO is a bottoms fraction from a fluid catalytic cracking unit having an initial boiling point of from about 400oF to about 620° F.

The hydrocracking process conditions include a space velocity of from 0.1 to 5 LHSV, a pressure of from about 500 to 2,000 psig, and a conversion of from about 40% to 60%. The hydrocracked product is then fractionated to provide a high octane gasoline fraction. The bottoms of the fractionating column may be drawn off or recycled to the hydrocracker. The catalyst of the present invention is superior in results to zeolite USY for producing a high octane gasoline.

DETAILED DESCRIPTION OF THE INVENTION

All percentages herein are by weight unless specified otherwise.

Figure 1:
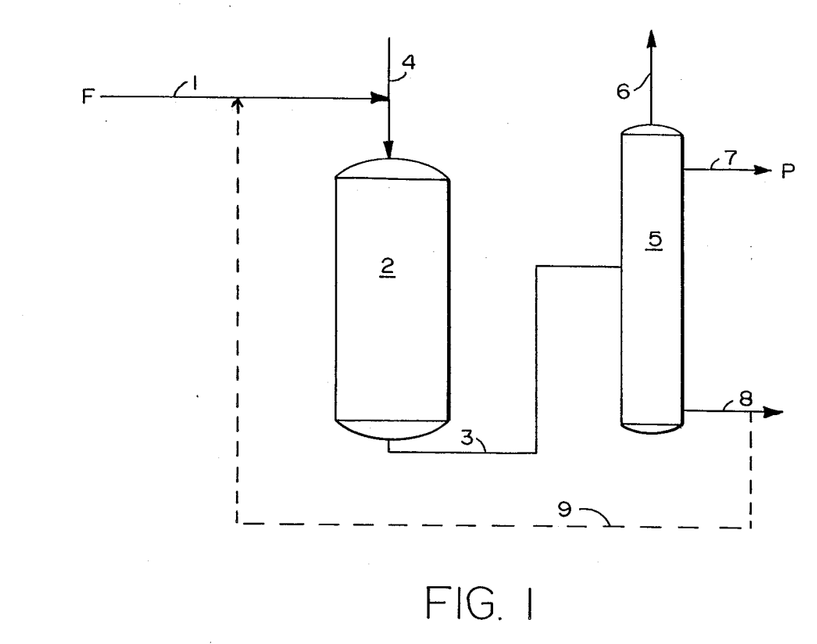
FIG. 1 is a diagrammatic chart of the process of the present invention.

Referring to FIG. 1, in the process of the present invention an aromatic hydrocarbon feedstock F is introduced into hydrocracker 2 via stream 1 with added hydrogen 4. The effluent 3 from hydrocracker 2 is then sent to fractionator 5 where hydrogen, ammonia, hydrogen sulfide and light hydrocarbons are removed via stream 6 by conventional processes. Product P is drawn off as stream 7, which comprises a high octane gasoline, e.g., a gasoline having an octane number not less than 87 (RON+0).

FEEDSTOCK

More particularly, the feeds used in the present process are hydrocarbon fractions which are highly aromatic and hydrogen deficient. They are fractions which have been substantially dealkylated, as by a catalytic cracking operation. It is characteristic of catalytic cracking that the alkyl groups, generally bulky, relatively large alkyl groups (typically but not exclusively $C_5$-$C_9$ alkyls), which are attached to aromatic moieties in the feed become removed during the course of the cracking. It is these detached alkyl groups which lead to the bulk of the gasoline product from the cracker. The aromatic moieties such as benzene, naphthalene, benzothiophenes, dibenzothiophenenes and polynuclear aromatics (PNAs) such as anthracene and phenanthrene form the high boiling products from the cracker. The mechanisms of acid-catalyzed cracking and similar reactions remove side chains of greater than 5 carbons while leaving behind short chain alkyl groups, primarily methyl, but also ethyl groups on the aromatic moieties. Thus, the "substantially dealkylated" cracking products include those aromatics with small alkyl groups, such as methyl, and ethyl, and the like still remaining as side chains, but with relatively few large alkyl groups, i.e., the $C_5$-$C_9$ groups, remaining. More than one of these short chain alkyl groups may be present, for example, one, two or more methyl groups.

Feedstocks of this type have an aromatic content in excess of 50 wt. percent; for example, 70 wt. percent or 80 wt. percent or more, aromatics. Highly aromatic feeds of this type typically have hydrogen contents below 14 wt. percent, usually below 12.5 wt. percent or even lower, e.g. below 10 wt. percent or 9 wt. percent. The API gravity is also a measure of the aromaticity of the feed, usually being below 30 and in most cases below 25 or even lower, e.g. below 20. In most cases the API gravity will be in the range of 5 to 25 with corresponding hydrogen contents from 8.5–12.5 wt. percent. Sulfur contents are typically from 0.5–5 wt. percent and nitrogen from 50-1000 ppmw.

Suitable feeds for the present process are substantially dealkylated cracking product fractions with an end point below 650° F. (345° C.), preferably below 600° F. (315° C.). Initial boiling point will usually be 300° F. (150° C.) or higher, e.g. 330° F. (165° C.) or 385° F. (195° C.). Light cut light cycle oils (LCOs) within these boiling ranges are highly suitable. A full range light cycle oil (FRCO) generally has a boiling point range between 385° and 750° F. (195°–400° C.). Light cycle oils generally contain from about 60 to 80 percent aromatics and, as a result of the catalytic cracking process, are substantially dealkylated. Other examples of suitable feedstocks include the dealkylated liquid products from delayed or fluid bed coking processes.

The appropriate boiling range fraction may be obtained by fractionation of a FRCO or by adjustment of the cut points on the cracker fractionation column. The light stream will retain the highly aromatic character of the catalytic cracking cycle oils (e.g. greater than 50 percent aromatics by silica gel separation) but the light fractions used in the present process generally exclude the heavier polynuclear aromatics (PNAs—three rings or more) which remain in the higher boiling range fractions. In addition, the heteroatom contaminants are concentrated in the higher boiling fractions so that the present hydrocracking step is operated substantially in their absence.

The use of the dealkylated feeds is a significant feature of the process. It will not produce high octane gasoline from predominantly virgin or straight run oils and which have not been previously dealkylated by processes such as catalytic cracking or coking. If the feed used in the present process has not been previously dealkylated, the large alkyl groups found in the feed will be cracked off during the hydrocracking and will be found in the resulting naphtha fraction. Because these groups are relatively straight chain, a low octane gasoline product will result. Smaller, i.e., $C_1$-$C_3$, alkyl side groups, if present do not appear in the naphtha boiling range products from the hydrocracker (even if conditions are severe enough to remove them) and so they have no effect on product octane. If a mixture of dealkylated and non-dealkylated feedstock is used, the octane number will be intermediate between the octane numbers of the feeds used separately. A mixture of alkylated and dealkylated feedstocks can be used in commercial operation but if so, it is likely that the gasoline will have to be subjected to a reforming process in order to achieve the desired octane.

CATALYST

The synthetic porous crystalline material employed as catalyst in the process of this invention, referred to herein as "zeolite MCM-22" or simply "MCM-22", exhibits unusual sorption capacities and unique catalytic utility.

In its calcined form, the synthetic porous crystalline material component employed in the catalyst composition used in the process of this invention is characterized by an X-ray diffraction pattern including the following lines:

TABLE I

| Interplanar d-Spacing (A) | Relative Intensity, $I/I_o \times 100$ |
| --- | --- |
| 30.0 ± 2.2 | W-M |
| 22.1 ± 1.3 | W |
| 12.36 ± 0.4 | M-VS |
| 11.03 ± 0.2 | M-S |
| 8.83 ± 0.14 | M-VS |
| 6.18 ± 0.12 | M-VS |
| 6.00 ± 0.10 | W-M |

TABLE I-continued

| Interplanar d-Spacing (A) | Relative Intensity, $I/I_o \times 100$ |
| --- | --- |
| 4.06 ± 0.07 | W-S |
| 3.91 ± 0.07 | M-VS |
| 3.42 ± 0.06 | VS |

More specifically, the calcined form may be characterized by an X-ray diffraction pattern including the following lines:

TABLE II

| Interplanar d-Spacing (A) | Relative Intensity, $I/I_o \times 100$ |
| --- | --- |
| 30.0 ± 2.2 | W-M |
| 22.1 ± 1.3 | W |
| 12.36 ± 0.4 | M-VS |
| 11.03 ± 0.2 | M-S |
| 8.83 ± 0.14 | M-VS |
| 6.86 ± 0.14 | W-M |
| 6.18 ± 0.12 | M-VS |
| 6.00 ± 0.10 | W-M |
| 5.54 ± 0.10 | W-M |
| 4.92 ± 0.09 | W |
| 4.64 ± 0.08 | W |
| 4.41 ± 0.08 | W-M |
| 4.25 ± 0.08 | W |
| 4.10 ± 0.07 | W-S |
| 4.06 ± 0.07 | W-S |
| 3.91 ± 0.07 | M-VS |
| 3.75 ± 0.06 | W-M |
| 3.56 ± 0.06 | W-M |
| 3.42 ± 0.06 | VS |
| 3.30 ± 0.05 | W-M |
| 3.20 ± 0.05 | W-M |
| 3.14 ± 0.05 | W-M |
| 3.07 ± 0.05 | W |
| 2.99 ± 0.05 | W |
| 2.82 ± 0.05 | W |
| 2.78 ± 0.05 | W |
| 2.68 ± 0.05 | W |
| 2.59 ± 0.05 | W |

These values were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the diffractometer. From these, the relative intensities, 100 $I/I_o$, where $I_o$ is the intensity of the strongest line or peak, and d (obs.) the interplanar spacing in Angstrom Units (A), corresponding to the record lines, were determined. In Tables I and II, the relative intensities are given in terms of the symbols W=weak, M=medium, S=strong, VS=very strong. In terms of intensities, these may be generally designated as follows:

W=0–20
M=20–40
S=40–60
VS=60–100

It should be understood that these X-ray diffraction patterns are characteristic of all species of the zeolite. The sodium form as well as other cationic forms reveal substantially the same pattern with some minor shifts in interplanar spacing and variation in relative intensity. Other minor variations can occur depending on the ratio of structural components, e.g. silicon to aluminum mole ratio of the particular sample, as well as its degree of thermal treatment.

Zeolite MCM-22 has a composition involving the molar relationship:

$X_2O_3:(n)YO_2,$ wherein X is a trivalent element, such as aluminum, boron, iron and/or gallium, preferably aluminum, Y is a tetravalent element such as silicon and/or germanium, preferably silicon, and n is at least about 10, usually from about 10 to about 150, more usually from about 10 to about 60, and even more usually from about 20 to about 40. In the as-synthesized form, zeolite MCM-22 has a formula, on an anhydrous basis and in terms of moles of oxides per n moles of $YO_2$, as follows:

$(0.005-0.1)Na_2O:(1-4)R:X_2O_3 n YO_2$ wherein R is an organic component. The Na and R components are associated with the zeolite as a result of their presence during crystallization, and are easily removed by post-crystallization methods hereinafter more particularly described.

Zeolite MCM-22 is thermally stable and exhibits a high surface area greater than about 400 $m^2$/gm as measured by the BET (Bruenauer, Emmet and Teller) test and unusually large sorption capacity when compared to previously described crystal structures having similar X-ray diffraction patterns. As is evident from the above formula, MCM-22 is synthesized nearly free of Na cations and thus possesses acid catalysis activity as synthesized. It can, therefore, be used as a component of the catalyst composition herein without having to first undergo an exchange step. To the extent desired, however, the original sodium cations of the as-synthesized material can be replaced in accordance with techniques well known in the art, at least in part, by ion exchange with other cations. Preferred replacement cations include metal ions, hydrogen ions, hydrogen precursor, e.g., ammonium, ions and mixtures thereof. Preferred cations are those which tailor the activity of the catalyst for hydrocracking. These include hydrogen, rare earth metals and metals of Groups IIA, IIIA, IVA, IB, IIB, IIIB, IVB and VIII of the Periodic Table of the Elements. Particularly preferred is a combination of nickel and tungsten or nickel and molybdenum.

In its calcined form, zeolite MCM-22 appears to be made up of a single crystal phase with little or no detectable impurity crystal phases and has an X-ray diffraction pattern including the lines listed in above Tables I and II.

Prior to its use in the catalyst composition herein, the synthetic porous crystalline material zeolite should be subjected to thermal treatment to remove part or all of any organic constituent present therein.

The zeolite present in the catalyst composition herein can also be used in intimate combination with a hydrogenating metal component from Group VIB and Group VIII of the Periodic Chart of the Elements Group VIB metals include chromium, molybdenum, and tungsten. Group VIII metals include iron, cobalt, and nickel. Also includable in the catalyst are manganese and rhenium (Group VIIB), and vanadium (Group VB). Such component can be associated chemically and/or physically with the zeolite and/or matrix with which the zeolite may be optionally composited. Thus, e.g., the hydrogenating component can be introduced into the catalyst composition by way of co-crystallization, exchanged into the composition to the extent a Group IIIA element (e.g., aluminum) is in the structure, impregnated therein or intimately physically admixed therewith. Such component can be impregnated in, or on, the zeolite, for example by treating the zeolite with a solution containing the metal-containing ion.

The zeolite, especially in its metal, hydrogen and ammonium forms, can be beneficially converted to another form by thermal treatment. This thermal treatment is generally performed by heating one of these forms at a temperature of at least about 370° C. for at least one minute and generally not longer than 20 hours. While subatmospheric pressure can be employed for the thermal treatment, atmospheric pressure is simply for reasons of convenience. The thermal treatment can be performed at a temperature of up to about 925° C.

Prior to its use in the catalyst composition and process of this invention, the zeolite crystals should be at least partially dehydrated. This can be accomplished by heating the crystals to a temperature in the range of from about 200° C. to about 595° C. in an atmosphere such as air, nitrogen, etc., and at atmospheric, subatmospheric pressures for a period of from between about 30 minutes to about 48 hours. Dehydration can also be performed at room temperature merely by placing the crystalline material in a vacuum but a longer time will be required to achieve a suitable degree of dehydration.

Zeolite MCM-22 can be prepared form a reaction mixture containing sources of alkali or alkaline earth metal (M), e.g., sodium or potassium, cation, an oxide of trivalent element X, e.g., aluminum, an oxide of tetravalent element Y, e.g., silicon, an organic (R) directing agent, hereinafter more particularly described, and water, said reaction mixture having a composition, in terms of mole ratios of oxides, within the following ranges:

| Reactants | Useful | Preferred |
|---|---|---|
| $YO_2/X_2O_3$ | 10–60 | 10–40 |
| $H_2O/YO_2$ | 5–100 | 10–50 |
| $OH^-/YO_2$ | 0.01–1.0 | 0.1–0.5 |
| $M/YO_2$ | 0.01–2.0 | 0.1–1.0 |
| $R/YO_2$ | 0.05–1.0 | 0.1–0.5 |

In a preferred method of synthesizing zeolite MCM-22, the $YO_2$ reactant contains a substantial amount of solid $YO_2$, e.g., at least about 30 wt. % solid $YO_2$. Where $YO_2$ is silica, the use of a silica source containing at least about 30 wt. % solid silica, e.g., Ultrasil (a precipitated, spray dried silica containing about 90 wt. % silica) or HiSil (a precipitated hydrated $SiO_2$ containing about 87 wt. % silica, about 6 wt. % free $H_2O$ and about 4.5 wt. % bound $H_2O$ of hydration and having a particle size of about 0.02 micron) favors MCM-2 crystal formation from the above mixture and is a distinct difference over the synthesis method disclosed in U.S. Patent No. 4,439,409 for synthesis of the "PSH-3" composition. If another source of oxide of silicon, e.g., Q-Brand (a sodium silicate comprised of about 28.8 wt. % of $SiO_2$, 8.9 wt. % $Na_2O$ and 62.3 wt. % $H_2O$) is used, crystallization may yield little if any MCM-22 crystalline material and impurity phases of other crystal structures, e.g., ZSM-12, may be produced. Preferably, therefore, the $YO_2$, e.g. silica, source contains at least 30 wt. % solid $YO_2$, e.g. silica, and more preferably at least 40 wt. % solid $YO_2$, e.g. silica.

Crystallization of the MCM-22 crystalline material can be carried out at either static or stirred conditions in a suitable reactor vessel such as, e.g., polypropylene jars or teflon-lined or stainless steel autoclaves. The total useful range of temperatures for crystallization is from about 80° C. to about 225° C. for a time sufficient for crystallization to occur at the temperature used, e.g., from about 25 hours to about 60 days. Thereafter, the crystals are separated from the liquid and recovered.

The organic directing agent for use in synthesizing zeolite MCM-22 from the above reaction mixture is hexamethyleneimine.

It should be realized that the reaction mixture components can be supplied by more than one source. The reaction mixture can be prepared either batchwise or continuously. Crystal size and crystallization time of the MCM-22 material will vary with the nature of the reaction mixture employed and the crystallization conditions. In all cases, synthesis of the MCM-22 crystals is facilitated by the presence of at least about 0.01 percent, preferably about 0.10 percent and still more preferably about 1 percent, seed crystals based on the total weight of the crystalline product formed.

The zeolite crystals can be shaped into a wide variety of particle sizes. Generally speaking, the particles can be provided in the form of a powder, a granule or a molded product such as an extrudate having a particle size sufficient to pass through a 2 mesh (Tyler) screen and be substantially retained on a 400 mesh (Tyler) screen. In cases where the catalyst is molded, such as by extrusion, the crystals can be extruded before drying or partially dried and then extruded.

It may be desired to incorporate the zeolite crystalline material with another material, i.e., a binder, which is resistant to the temperatures and other conditions employed in the process of this invention. Suitable binder materials include active and inactive materials and synthetic or naturally occurring zeolites as well as inorganic materials such as clays, silica and/or metal oxides such as alumina. The latter can be either naturally occurring or provided in the form of a gelatinous precipitates or gels including mixtures of silica and metal oxides. Use of a binder material in conjunction with the zeolite, i.e., combined therewith or present during its synthesis, which itself is catalytically active may change the conversion and/or selectivity of the catalyst. Inactive materials suitably serve as diluents to control the amount of conversion so that products can be obtained economically and in a controlled fashion without having to employ other means for controlling the rate of reaction. These materials can be incorporated into naturally occurring clays, e.g., bentonite and kaolin, to improve the crush strength of the zeolite under commercial operating conditions. Good crush strength is an advantageous attribute for commercial use since it prevents or delays breaking down of the catalyst into powder-like materials.

Naturally occurring clays which can be composited with the zeolite crystals include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the zeolite also include inorganic oxides, notably alumina.

Apart from or in addition to the foregoing binder materials, the zeolite crystals can be composited with an inorganic oxide matrix such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia, silica-magnesia-zirconia, etc. It may also be advantageous to provide at least a part of the foregoing matrix materials in colloidal form so as to facilitate extrusion of the bound catalyst component(s).

The relative proportions of finely divided crystalline material and inorganic oxide matrix can vary widely with the zeolite content ranging from about 1 to about 95 percent by weight and more usually, particularly when the composite is prepared in the form of beads, in the range of about 2 to about 80 weight percent of the composite.

In the process of the present invention the catalyst comprises from about 1% to about 6% nickel and from about 5% to about 15% tungsten, preferably about 4.2% nickel and about 10.8% tungsten incorporated into a 65% MCM-22/35% $Al_2O_3$ extrudate. The catalyst may be steamed or unsteamed. Steaming generally increases the stability of a zeolite catalyst and may be accomplished with 5-100% steam at a temperature of at least 300° C. for at least one hour at a pressure of 100-2,500 kPa. However, steaming can reduce the catalyst activity and effect product yield.

The hydrocracking process of the present invention may be carried out at from 500 to 2,000 psig, preferably from about 800 psig to about 1000 psig, e.g. about 900 psig.

Liquid hourly space velocity (LHSV) may be from about 0.1 to 5 $hr^{-1}$, and preferably about 0.5-2.0 $hr^{-1}$. The conversion is preferably from about 40% to 60%.

Referring again to FIG. 1, the product P, a high octane gasoline fraction, is drawn off fractionating column 5 via stream 7. After 10 days on stream NiW/MCM-22 can produce a gasoline fraction with a research octane rating over 96. Light gases are removed via stream 6, and a 420oF+boiling bottoms product containing higher boiling components useful in diesel fuels may either be drawn off via stream 8, or recycled back to the hydrocracker via stream 9.

In order to more fully illustrate the hydrocracking process of this invention and the manner of practicing same, the following examples are presented. In examples illustrative of the synthesis of zeolite MCM-22, whenever sorption data are set forth for comparison of sorptive capacities for water, cyclohexane and/or n-hexane, they were Equilibrium Adsorption values determined as follows:

A weighed sample of the calcined adsorbent was contacted with the desired pure adsorbate vapor in an adsorption chamber, evacuated to less than 1 mm Hg and contacted with 12 Torr of water vapor or 40 Torr of n-hexane or 40 Torr of cyclohexane vapor, pressures less than the vapor-liquid equilibrium pressure of the respective adsorbate at 90° C. The pressure was kept constant (within about±0.5 mm Hg) by addition of adsorbate vapor controlled by a manostat during the adsorption period, which did not exceed about 8 hours. As adsorbate was adsorbed by the MCM-22 crystalline material, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbant. Zeolite MCM-22 always exhibits Equilibrium Adsorption values of greater than about 10 wt. % for water vapor, greater than about 4.5 wt. %, usually greater than about 7 wt. % for cyclohexane vapor and greater than about 10 wt.

% for n-hexane vapor. These vapor sorption capacities are a notable distinguishing feature of zeolite MCM-22.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha Test is described in U.S. Patent 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395.

EXAMPLE 1

One part of sodium aluminate (43.5% $Al_2O_3$, 32.2% $Na_2O$, 25.6% $H_2O$) was dissolved in a solution containing 1 part of 50% NaOH solution and 103.13 parts $H_2O$. To this was added 4.50 parts hexamethyleneimine. The resulting solution was added to 8.55 parts of Ultrasil, a precipitated, spray-dried silica (about 90% $SiO_2$).

The reaction mixture had the following composition, in mole ratios:

| | |
|---|---|
| $SiO_2/Al_2O_3$ | 30.0 |
| $OH^-/SiO_2$ | 0.18 |
| $H_2O/SiO_2$ | 44.9 |
| $Na/SiO_2$ | 0.18 |
| $R/SiO_2$ | 0.35 | where R is hexamethyleneimine.

The mixture was crystallized in a stainless steel reactor, with stirring, at 150° C. for 7 days. The crystalline product was filtered, washed with water and dried at 120° C. After a 20 hour calcination at 538° C, the X-ray diffraction pattern contained the major lines listed in Table III. The sorption capacities of the calcined material were measured to be:

| | |
|---|---|
| $H_2O$ | 15.2 wt. % |
| Cyclohexane | 14.6 wt. % |
| n-Hexane | 16.7 wt. % |

The surface area of the zeolite was measured to be 494 $m^2/g$.

The chemical composition of the uncalcined material was determined to be as follows:

| Component | wt. % |
|---|---|
| $SiO_2$ | 66.9 |
| $Al_2O_3$ | 5.40 |
| Na | 0.03 |
| N | 2.27 |
| Ash | 76.3 |
| $SiO_2/Al_2O_3$, mole ratio | 21.1 |

TABLE III

| Degrees 2-Theta | Interplanar d-Spacing (A) | $I/I_o$ |
|---|---|---|
| 2.80 | 31.55 | 25 |
| 4.02 | 21.98 | 10 |
| 7.10 | 12.45 | 96 |
| 7.95 | 11.12 | 47 |
| 10.00 | 8.85 | 51 |
| 12.90 | 6.86 | 11 |
| 14.34 | 6.18 | 42 |
| 14.72 | 6.02 | 15 |
| 15.90 | 5.57 | 20 |
| 17.81 | 4.98 | 5 |
| 20.20 | 4.40 | 20 |
| 20.91 | 4.25 | 5 |
| 21.59 | 4.12 | 20 |
| 21.92 | 4.06 | 13 |
| 22.67 | 3.92 | 30 |
| 23.70 | 3.75 | 13 |
| 24.97 | 3.57 | 15 |
| 25.01 | 3.56 | 20 |
| 26.00 | 3.43 | 100 |
| 26.69 | 3.31 | 14 |
| 27.75 | 3.21 | 15 |
| 28.52 | 3.13 | 10 |
| 29.01 | 3.08 | 5 |
| 29.71 | 3.01 | 5 |
| 31.61 | 2.830 | 5 |
| 32.21 | 2.779 | 5 |
| 33.35 | 2.687 | 5 |
| 34.61 | 2.592 | 5 |

EXAMPLE 2

A portion of the calcined crystalline product of Example 1 was tested in the Alpha Test and was found to have an Alpha Value of 224.

EXAMPLES 3–5

Three separate synthesis reaction mixtures were prepared with compositions indicated in Table IV. The mixtures were prepared with sodium aluminate, sodium hydroxide, Ultrasil, hexamethyleneimine (R) and water. The mixtures were maintained at 150° C., 143° C. and 150° C., respectively, for 7, 8 and 6 days respectively in stainless steel autoclaves at autogenous pressure. Solids were separated from any unreacted components by filtration and then water washed, followed by drying at 120° C. The product crystals were subjected to X-ray diffraction, sorption, surface area and chemical analyses. The results of the sorption, surface area and chemical analyses are presented in Table IV. The sorption and surface area measurements were of the calcined product.

TABLE IV

| | Example | | |
|---|---|---|---|
| | 3 | 4 | 5 |
| Synthesis Mixture, mole ratios | | | |
| $SiO_2/Al_2O_3$ | 30.0 | 30.0 | 30.0 |
| $OH^-/SiO_2$ | 0.18 | 0.18 | 0.18 |
| $H_2O/SiO_2$ | 19.4 | 19.4 | 44.9 |
| $Na/SiO_2$ | 0.18 | 0.18 | 0.18 |
| $R/SiO_2$ | 0.35 | 0.35 | 0.35 |
| Product Composition, Wt. % | | | |
| $SiO_2$ | 64.3 | 68.5 | 74.5 |
| $Al_2O_3$ | 4.85 | 5.58 | 4.87 |
| Na | 0.08 | 0.05 | 0.01 |
| N | 2.40 | 2.33 | 2.12 |
| Ash | 77.1 | 77.3 | 78.2 |
| $SiO_2/Al_2O_3$, mole ratio | 22.5 | 20.9 | 26.0 |
| Adsorption, Wt. % | | | |
| $H_2O$ | 14.9 | 13.6 | 14.6 |
| Cyclohexane | 12.5 | 12.2 | 13.6 |
| n-Hexane | 14.6 | 16.2 | 19.0 |
| Surface area, $m^2/g$ | 481 | 492 | 487 |

EXAMPLE 6

Quantities of the calcined (538° C. for 3 hours) crystalline silicate products of Examples 3, 4 and 5 were tested in the Alpha Test and found to have Alpha Values of 227, 180 and 187, respectively.

EXAMPLE 7

To demonstrate a further preparation of the present zeolite, 4.49 parts of hexamethyleneimine was added to a solution containing 1 part of sodium aluminate, 1 part of 50% NaOH solution and 44.19 parts of $H_2O$. To the combined solution was added 8.54 parts of Ultrasil silica. The mixture was crystallized with agitation at 145° C. for 59 hours and the resultant product was water washed and dried at 120° C.

Product chemical composition, surface area and adsorption analyses results were as set forth in Table V:

TABLE V

| Product Composition (uncalcined) | |
| --- | --- |
| C | 12.1 wt. % |
| N | 1.98 wt. % |
| Na | 640 ppm |
| $Al_2O_3$ | 5.0 wt. % |
| $SiO_2$ | 74.9 wt. % |
| $SiO_2/Al_2O_3$, mole ratio | 25.4 |
| Adsorption, wt. % | |
| Cyclohexane | 9.1 |
| N-hexane | 14.9 |
| $H_2O$ | 16.8 |
| Surface Area, $m^2/g$ | 479 |

EXAMPLE 8

Twenty-five grams of solid crystal product from Example 7 were calcined in a flowing nitrogen atmospheres at 538° C. for 5 hours, followed by purging with 5% oxygen gas (balance $N_2$) for another 16 hours at 538° C.

Individual 3 g samples of the calcined material were ion-exchanged with 100 ml of 0.1N TEABr, TPABr and $LaCl_3$ solution separately. Each exchange was carried out at ambient temperature for 24 hours and repeated three times. The exchanged samples were collected by filtration, water-washed to be halide-free and dried. The compositions of the exchanged samples are tabulated below demonstrating the exchange capacity of the present crystalline silicate for different ions.

| | Exchange Ions | | |
| --- | --- | --- | --- |
| Ionic Composition, wt. % | TEA | TPA | La |
| Na | 0.095 | 0.089 | 0.063 |
| N | 0.30 | 0.38 | 0.03 |
| C | 2.89 | 3.63 | — |
| La | — | — | 1.04 |

EXAMPLE 9

The La-exchanged sample from Example 8 was sized to 14 to 25 mesh and then calcined in air at 538° C. for 3 hours. The calcined material had an Alpha Value of 173.

EXAMPLE 10

The calcined sample La-exchanged material from Example 9 was severely steamed at 649° C. in 100% steam for 2 hours. The steamed sample had an Alpha Value of 22, demonstrating that the zeolite had very good stability under severe hydrothermal treatment.

EXAMPLE 11

This example illustrates the preparation of the present zeolite where X in the general formula, supra, is boron. Boric acid, 2.59 parts, was added to a solution containing 1 part of 45% KOH solution and 42.96 parts $H_2O$. To this was added 8.56 parts of Ultrasil silica, and the mixture was thoroughly homogenized. A 3.88 parts quantity of hexamethyleneimine was added to the mixture.

The reaction mixture had the following composition in mole ratios:

| | |
| --- | --- |
| $SiO_2/B_2O_3$ | 6.1 |
| $OH^-/SiO_2$ | 0.96 |
| $H_2O/SiO_2$ | 19.0 |
| $K/SiO_2$ | 0.06 |
| $R/SiO_2$ | 0.30 | where R is a hexamethyleneimine.

The mixture was crystallized in a stainless steel reactor, with agitation, at 150° C. for 8 days. The crystalline product was filtered, washed with water and dried at 120° C. A portion of the product was calcined for 6 hours at 540° C. and found to have the following sorption capacities:

| | |
| --- | --- |
| $H_2O$ | 11.7 wt. % |
| Cyclohexane | 7.5 wt. % |
| n-Hexane | 11.4 wt. % |

The surface area of the calcined crystalline material was measured (BET) to be 405 $m^2/g$.

The chemical composition of the uncalcined material was determined to be as follows:

| | |
| --- | --- |
| N | 1.94 wt. % |
| Na | 175 ppm |
| K | 0.60 wt. % |
| Boron | 1.04 wt. % |
| $Al_2O_3$ | 920 ppm |
| $SiO_2$ | 75.9 wt. % |
| Ash | 74.11 wt. % |
| $SiO_2/Al_2O_3$, molar ratio | 1406 |
| $SiO_2/(Al + B)_2O_3$, molar ratio | 25.8 |

EXAMPLE 12

A portion of the calcined crystalline product of Example 11 was treated with $NH_4Cl$ and again calcined. The final crystalline product was tested in the Alpha test and found to have an Alpha Value of 1.

EXAMPLE 13

This example illustrates another preparation of the zeolite in which X of the general formula, supra, is boron. Boric acid, 2.23 parts, was added to a solution of 1 part of 50% NaOH solution and 73.89 parts $H_2O$. To this solution was added 15.29 parts of HiSil silica followed by 6.69 parts of hexamethyleneimine. The reaction mixture had the following composition in mole ratios:

| | |
| --- | --- |
| $SiO_2/B_2O_3$ | 12.3 |
| $OH^-/SiO_2$ | 0.056 |

-continued

| | |
|---|---|
| H₂O/SiO₂ | 18.6 |
| K/SiO₂ | 0.056 |
| R/SiO₂ | 0.30 | where R is hexamethyleneimine.

The mixture was crystallized in a stainless steel reactor, with agitation, at 300° C. for 9 days. The crystalline product was filtered, washed with water and dried at 120° C. The sorption capacities of the calcined material (6 hours at 540° C.) were measured:

| | |
|---|---|
| H₂O | 14.4 wt. % |
| Cyclohexane | 4.6 wt. % |
| n-Hexane | 14.0 wt. % |

The surface area of the calcined crystalline material was measured to be 438m²/g.

The chemical composition of the uncalcined material was determined to be as follows:

| Component | Wt. % |
|---|---|
| N | 2.48 |
| Na | 0.06 |
| Boron | 0.83 |
| Al₂O₃ | 0.50 |
| SiO₂ | 73.4 |
| SiO₂/Al₂O₃, molar ratio | 249 |
| SiO₂/(Al + B)₂O₃, molar ratio | 28.2 |

EXAMPLE 14

A portion of the calcined crystalline product of Example 13 was tested in the Alpha Test and found to have an Alpha Value of 5.

EXAMPLE 15

Zeolite MCM-22 was synthesized as in Example 7 for use in preparing the nickel and tungsten-containing catalyst composition used in the hydrocracking process of this invention as illustrated in Example 18, infra. A mixture of 65 wt. % of the dried MCM-22 crystals and 35 wt. % Kaiser SA alumina were mulled together, the mixture was extruded with sufficient added water to provide a 1/16 inch diameter extrudate and the extrudate was dried at 250oF The dried extrudate was then heated at 5° F./minute to 900oF in flowing nitrogen; held at 900° F. for 3 hours in flowing nitrogen; and held at 900oF for 1 hour in a 50/50 volume ratio of air/nitrogen. The extrudate was then heated to 1000oF at 5oF/minute in the 50/50 air nitrogen/mixture, and held at 1000oF for 3 hours.

The zeolite MCM-22/Al₂O₃ catalyst composition thus prepared was found to have the following physical properties (Table VI):

TABLE IV

| Properties of Zeolite MCM-22 Catalyst | |
|---|---|
| Alpha Value | 259 |
| Sodium, ppm | 265 |
| Density, g/cc | |
| Particle | 0.77 |
| Real | 2.59 |
| Pore Volume, cc/g | 0.91 |
| Surface Area, m²/g | 374 |
| Pore Diameter, Angstroms | 97 |
| Crush, lb/in² | 76 |

The dried composition was then impregnated to incipient wetness at room temperature with a solution of 0.176 g/g of ammonium meta tungstate (92.1% WO₃ wt.), dried in air at room temperature for 4 hours, then dried at 250° F. overnight.

The dried composition was then calcined in flowing dry air at (5 v/v/min), heating at 5oF/min. to 1000° F., and held at 1,000° F. for 3 hours in the flowing dry air.

The resulting composition was then impregnated to incipient wetness at room temperature with a solution of 0.213 g/g of Ni(NO₃)₂.6H₂O, dried in air at room temperature for 4 hours, then dried at 250° F. overnight.

The dried composition was then calcined in flowing dry air (5/v/v/min), heating at 5oF/min. to 1000° F. and held at 1000° F. for 3 hours in the flowing air. The final composition contained 4.2 wt. % Ni and 10.8 wt. % W. The catalyst properties are shown in Table VIII of Example 18, infra.

EXAMPLE 16

A nickel and molybdenum containing unsteamed alumina-bound USY catalyst composition was prepared for comparison with the nickel and tungsten containing unsteamed MCM-22 composition of Example 15 for catalyzing the hydrocracking process illustrated in Example 18, infra.

The USY catalyst composition was prepared by mixing 75 wt. % USY zeolite with 25 wt. % alumina. The extrudate was dried at 250° F. then calcined for 3 hours at 1,000° F.

It was then exchanged with IN ammonium nitrate (NH₄NO₃) solution, dried and calcined again. After two more exchanges with ammonium nitrate followed by drying and calcining for each exchange, the composition was impregnated to incipient wetness with a solution of ammonium heptamolybdate/nickel nitrate. The catalyst was dried and calcined.

EXAMPLE 17

A nickel and tungsten-containing alumina-bound USY catalyst composition was prepared for comparison with the nickel and tungsten-containing MCM-22 catalyst composition of Example 15 for catalyzing the hydrocracking process illustrated in Example 18, infra.

The USY catalyst composition was prepared by mixing 75 wt. % USY zeolite with 25 wt. % alumina, extruding, exchanging with NH₄NO₃ solution as described in Example 16, steaming with 1000° F. steam for 10 hours and co-impregnating with a solution containing nickel and tungsten salts.

EXAMPLE 18

A feedstock comprising light cycle oil was provided, said feedstock having properties as shown in Table VII. The feedstock was derived from a full range cycle oil (bp. 420° F. to 750° F.) and had an aromatics content of over 78%.

TABLE VII

| Feedstock Properties | |
|---|---|
| General Properties | |
| Gravity, API° | 15.5 |
| Hydrogen, wt. % | 9.41 |
| Sulfur, wt. % | 3.0 |
| Nitrogen, ppmw | 220 |
| Basic Nitrogen, ppmw | 42 |
| Composition, wt. % | |
| Paraffins | 14.3 |
| Naphthenes | 7.4 |

TABLE VII-continued

| Feedstock Properties | |
|---|---|
| Aromatics | 78.3 |
| Distillation, °F. | D86 |
| IBP | 426 |
| 5% | 479 |
| 10% | 481 |
| 30% | 503 |
| 50% | 519 |
| 70% | 537 |
| 90% | 571 |
| 95% | 596 |
| EP | 626 |

Catalysts derived from examples 15, 16 and 17 were provided, the catalyst samples having the properties shown in Table VIII.

TABLE VIII

| | Catalyst Properties | | |
|---|---|---|---|
| | NiW/MCM-22 | NiMo/USY | NiW/USY |
| Steaming of Zeolite | No | No | Yes |
| Composition, wt. % | | | |
| Zeolite* | 65 | 75 | 75 |
| Nickel | 4.2 | 4.1 | 4.0 |
| Molybdenum | — | 6.3 | — |
| Tungsten | 10.8 | — | 9.4 |
| Density, g/cc | | | |
| Particle | 0.951 | 1.052 | 1.087 |
| Real | 2.957 | 2.759 | 2.915 |
| Physical Properties | | | |
| Pore Vol., cc/g | 0.713 | 0.588 | 0.577 |
| Surface Area, m²/g | 303 | 412 | 391 |
| Pore diameter, A | 94 | 57 | 59 |
| Alpha Number* | 259 | 217 | 73 |

*Prior to the metal additions

The feedstock was sent through a hydrocracker pilot unit under hydrocracking conditions and operated at 0.75 LHSV, 900 psig inlet hydrogen pressure and at 45% conversion (to 390° F.-boiling). The hydrocracker was charged respectively with unsteamed NiW/MCM-22, unsteamed NiMo/USY, and steamed NiW/USY, for the respective sample runs.

Figure 2:
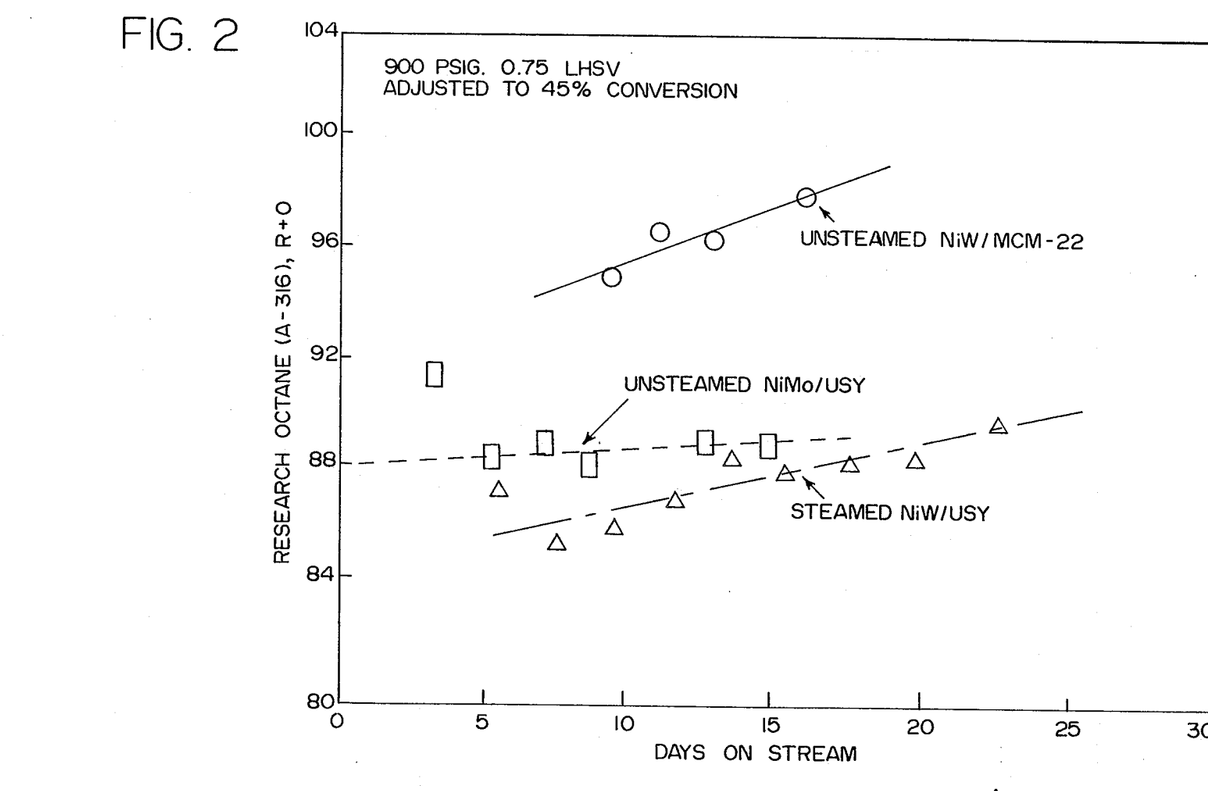
FIG. 2 is a graph comparing the octane ratings of gasoline produced in accordance with the present invention with the octane ratings of the gasoline produced by prior known zeolites.

The results of the hydrocracking process are illustrated in FIG. 2. The product for the NiW/MCM-22 catalyst had an octane rating of over 96 after 10 days and over 98 after 15 days. The octane rating for the products of the NiMo/USY and NiW/USY catalysts remained below 90 during the same on-stream line periods.

What is claimed is:

1. A process for producing high octane gasoline from an aromatic containing dealkylated hydrocarbon feedstock comprising contacting said feedstock with a catalyst composition under hydrocracking conditions, said catalyst composition comprising a synthetic zeolite characterized by an X-ray diffraction pattern including values substantially as set forth in Table I of the specification.

2. The process of claim 1 wherein said zeolite is characterized by an X-ray diffraction pattern including values substantially as set forth in Table II of the specification.

3. The process of claim 1 wherein the synthetic zeolite has a composition comprising the molar relationship:

$$X_2O_3:(n)YO_2$$

wherein X is a trivalent element selected from the group consisting of aluminum, boron, iron, and gallium, Y is a tetravalent element selected from the group consisting of silicon and germanium, and n is at least about 10.

4. The process of claim 1 wherein said synthetic zeolite has been treated to replace original ions, at least in part, with an ion or mixture of ions selected from the group consisting of hydrogen, rare earth metals, and metals of Groups IIA, IIIA, IVA, IB, IIB, IIIB, IVB, VIB, and VIII of the Periodic Table.

5. The process of claim 1 wherein said synthetic zeolite has been treated to replace original cations at least in part with a mixture of nickel and tungsten.

6. The process of claim 1 wherein said synthetic zeolite has been thermally treated at a temperature of up to about 925° C.

7. The process of claim 1 wherein the feedstock is a product of a cracking process.

8. The process of claim 1 wherein the hydrocracking conditions include a pressure of from about 500 to 2000 psig, a liquid hourly space velocity of from about 0.1 to about 5 hr$^{-1}$ and a conversion of from about 40% to about 60%.

9. The process of claim 1 wherein the feedstock has an end boiling point below 650° F.

10. The process of claim 1 wherein said synthetic zeolite has been treated to contain nickel and tungsten.

11. The process of claim 1 wherein said feedstock comprises a hydrocarbon fraction having a boiling range between about 400° F. and 620° F.

12. The process of claim 1 wherein said feedstock has an aromatics content over 50 weight percent.

13. The process of claim 1 wherein said feedstock has an aromatics content over 70 weight percent.

14. The process of claim 1 wherein said feedstock has an aromatics content over 78 weight percent.

15. The process of claim 1 wherein said gasoline has a research octane rating over 90.

16. The process of claim 1 wherein said process additionally produces a 420° F.+ boiling fraction which is separated by fractionation.

17. The process of claim 16 wherein said 420° F.+ boiling fraction is at least partially recycled for recontacting with said synthetic zeolite under hydrocracking conditions.

* * * * *

UNITED STATES PATENT AND TRADEMARK OFFICE
CERTIFICATE OF CORRECTION

PATENT NO. : 4,968,402

DATED : 11/6/90

INVENTOR(S) : G.W. Kirker et al

It is certified that error appears in the above-identified patent and that said Letters Patent is hereby corrected as shown below:

Col. 16, line 58, add claims 18 and 19:

—18. The process of claim 5 wherein the catalyst comprises from about 1% to about 6% nickel and from about 5% to about 15% tungsten.—

—19. The process of claim 10 wherein the catalyst comprises from about 1% to about 6% nickel and from about 5% to about 15% tungsten.—

Signed and Sealed this

Twenty-fourth Day of December, 1991

Attest:

HARRY F. MANBECK, JR.

*Attesting Officer*  *Commissioner of Patents and Trademarks*